United States Patent [19]
Krehbiel

[11] 4,202,624
[45] May 13, 1980

[54] MASKING DEVICE FOR CROPPING PHOTOGRAPHS VIEWED ON A VIEW SCREEN OF A PHOTOGRAPHIC PRINTER

[75] Inventor: Vivian D. Krehbiel, Wichita, Kans.

[73] Assignee: Kreonite Inc., Wichita, Kans.

[21] Appl. No.: 942,873

[22] Filed: Sep. 15, 1978

[51] Int. Cl.² ............... G03B 17/02; G03B 13/28; G03B 27/58
[52] U.S. Cl. ............................ 355/45; 354/159; 355/74
[58] Field of Search ............... 354/161, 222, 159; 355/41, 43, 44, 45, 74

[56] References Cited
U.S. PATENT DOCUMENTS

| | | | |
|---|---|---|---|
| 1,084,234 | 1/1914 | Scott | 354/159 |
| 2,247,104 | 6/1941 | Takács | 354/159 |
| 2,938,427 | 5/1960 | Alves | 355/45 |
| 3,488,119 | 1/1970 | Dixon et al. | 355/74 |
| 3,560,087 | 2/1971 | Washio et al. | 355/74 X |
| 3,685,904 | 8/1972 | Kring et al. | 355/74 |

*Primary Examiner*—Donald A. Griffin
*Attorney, Agent, or Firm*—Edwin H. Crabtree

[57] ABSTRACT

A masking device for cropping photographs which are viewed on a view screen of a photographic printer. The masking device allowing the operator of the photographic printer to see exactly what portion of a photograph is being cropped prior to the printing of the photograph. The mask further providing a key for signaling the electronic system of the printer how much paper should be advanced for the cropped photograph and correcting the exposure setting of the printer.

7 Claims, 9 Drawing Figures

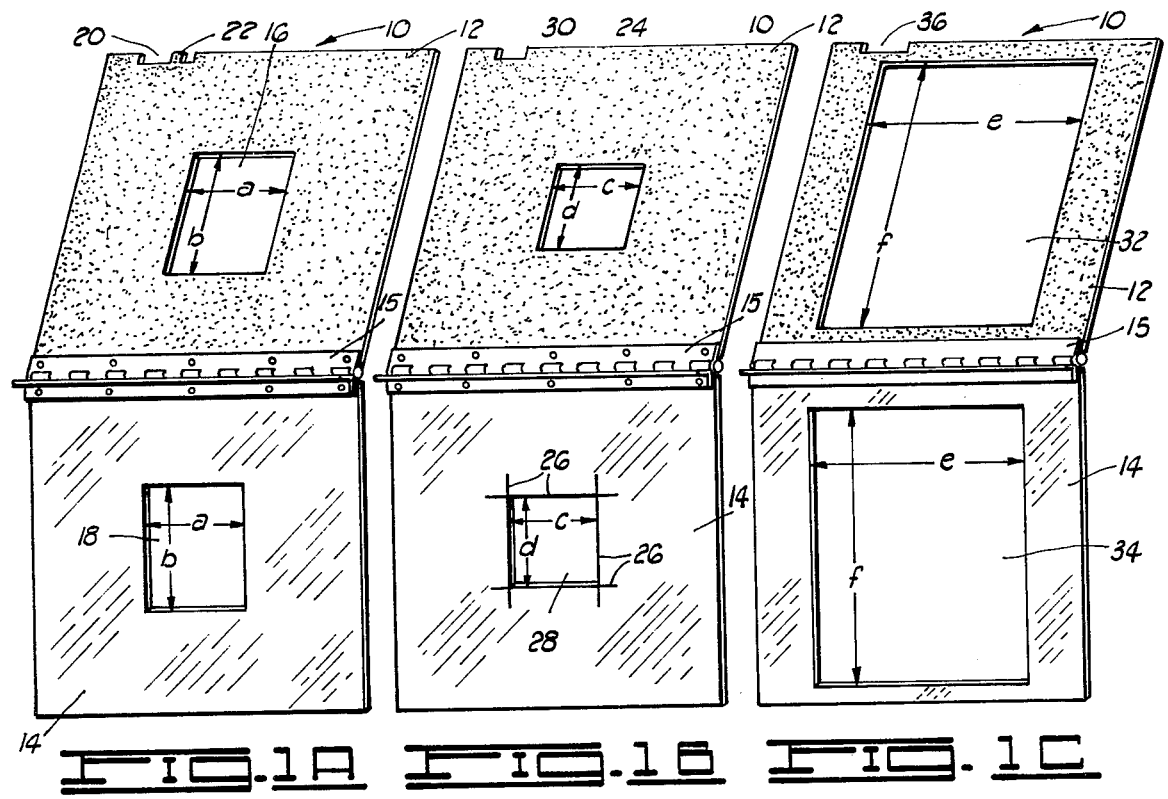
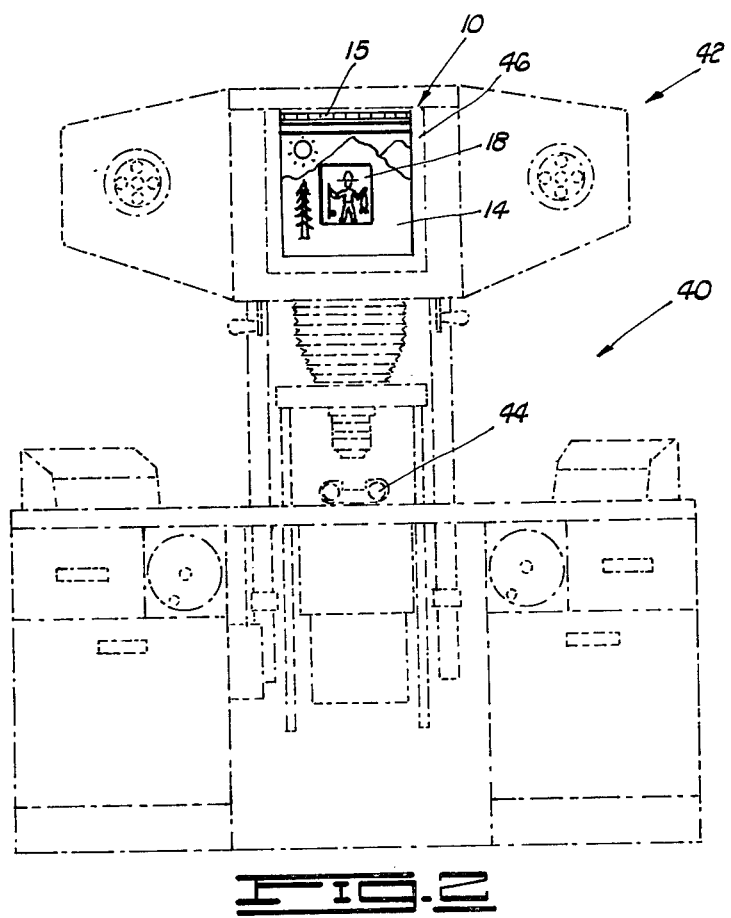

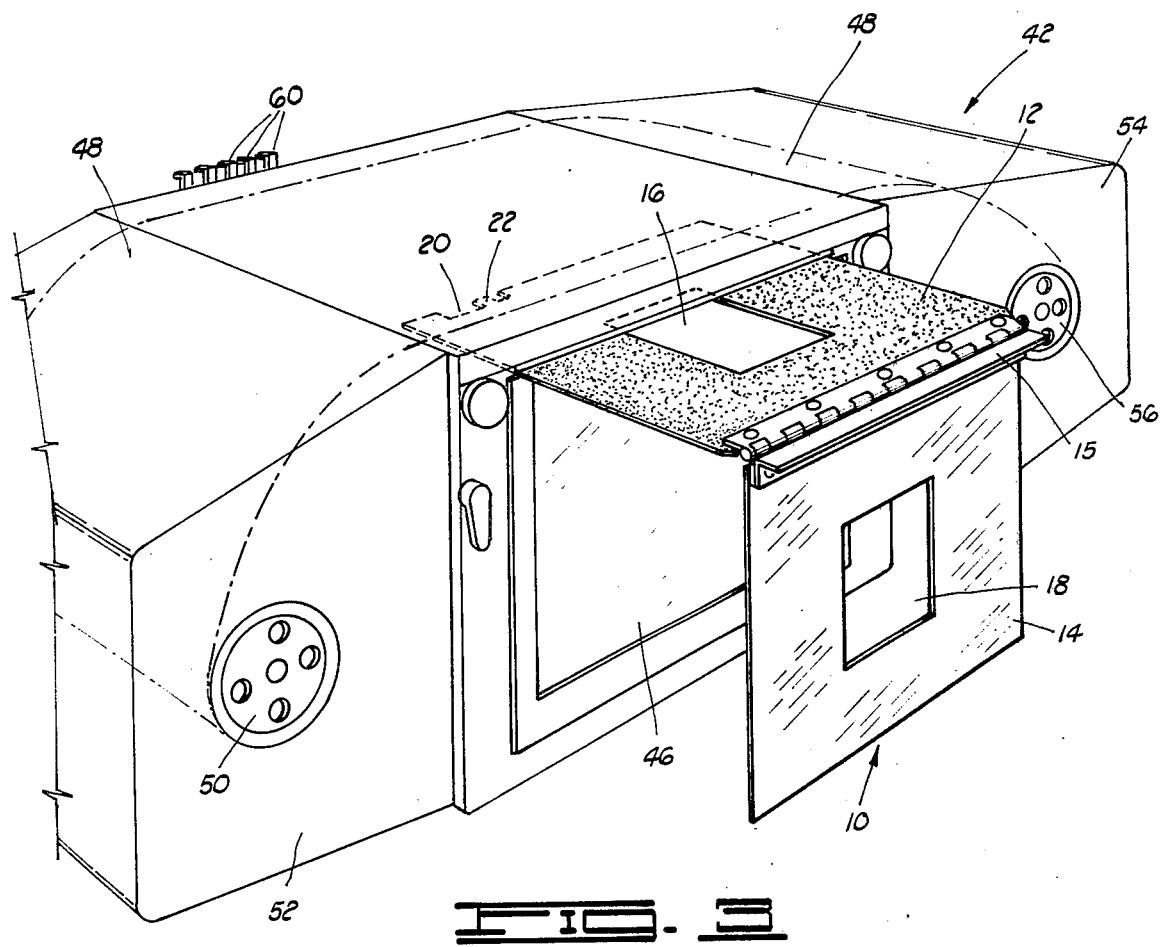
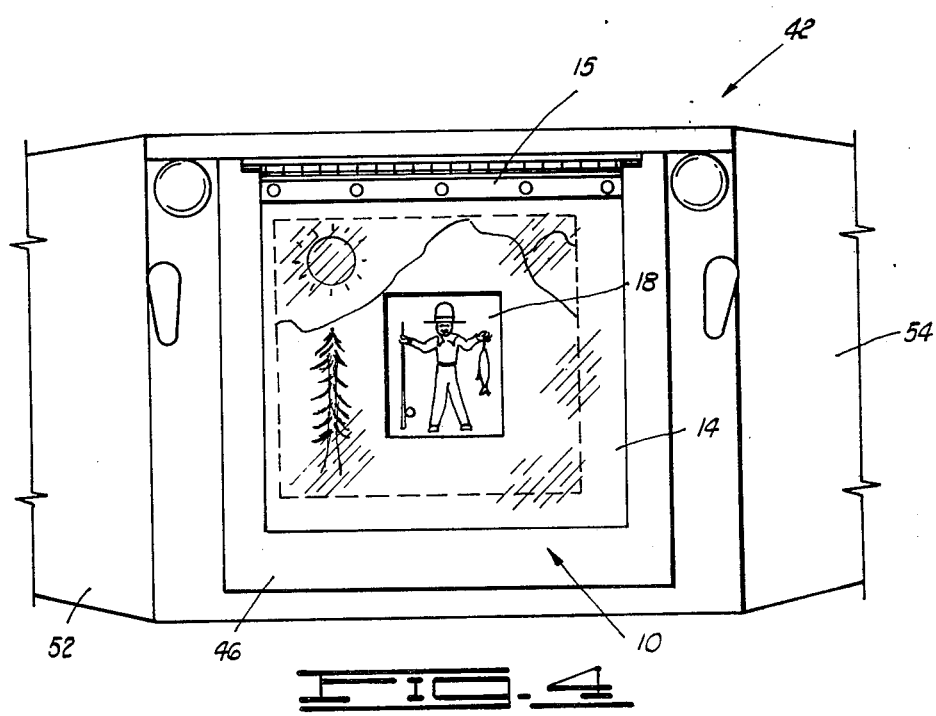

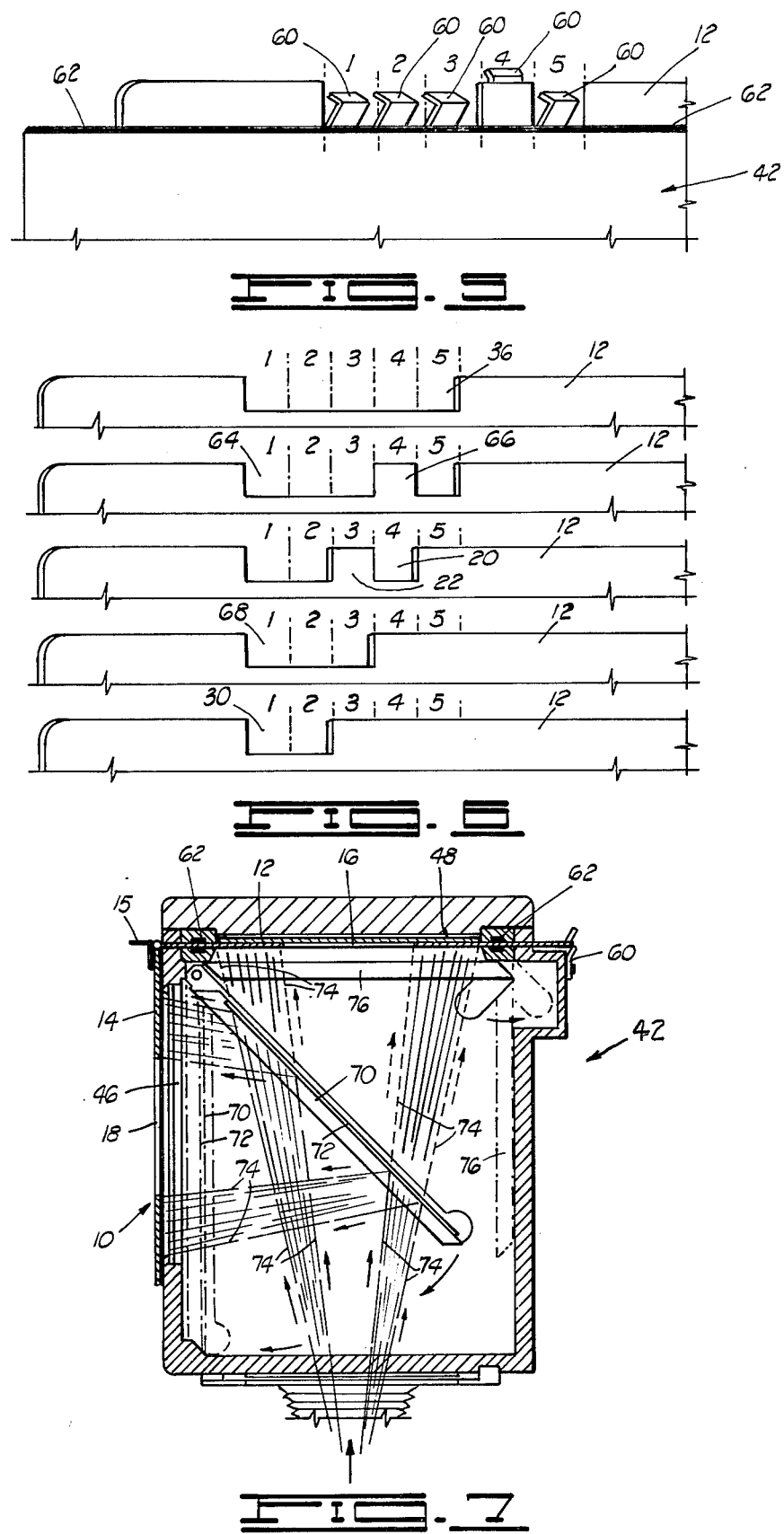

MASKING DEVICE FOR CROPPING PHOTOGRAPHS VIEWED ON A VIEW SCREEN OF A PHOTOGRAPHIC PRINTER

BACKGROUND OF THE INVENTION

This invention relates generally to a masking device for cropping photographs and more particularly but not by way of limitation to a masking device for mounting on a printer head of a photographic printer with a portion of the masking device received in front of the photographic paper in the printer head with the remaining portion of the masking device disposed in front of a view screen of the printer. Heretofore, cropping of photographs were done by manually cutting the photographs to a standard photographic size by scissors or a paper cutter. Generally in the photographic industry, the standard photograph sizes are 8"×10", 5"×7", 4"×5", 3½"×5" and 3½"×3½".

Prior art printers have included view screens which were marked with intersecting lines outlining the standard sizes. For example, an 8"×10" negative or positive photograph could be viewed on the view screen and centered thereon, so that it could be determined what would be shown if the photograph was cropped to a standard 5×7 inch size. This method showed only what was cropped on the view screen and did not provide for cropping the photographic paper in the print head. This method contributed to waste of photographic paper since all of the photographs were printed for example, to a standard 8"×10" size and then reduced to a smaller size by manually cutting the printed photograph.

The subject masking device eliminates the above problems in the viewing and cropping of photographs printed on a photograph printer.

SUMMARY OF THE INVENTION

The subject invention crops photographs viewed on a view screen of a photographic printer. The device masks the print paper so that the exposed print is the same size as the masked image viewed on the view screen. Further, the masking device allows the operator of the photographic printer to see exactly what portion of the photograph is being cropped prior to the printing of the photograph and if the negative or positive needs to be adjusted on the printer.

The invention is readily adaptable to various types and sizes of photographic printers and may be made for cropping various sizes of photographic prints.

The masking device includes a key slot having tabs which are used for signalling the electrical system of the printer on how much print paper should be advanced for the cropped photograph. This reduces waste of the print paper used in the printer. The key slot in the masking device is also used with the electrical system for correcting the exposure setting of the printer for the size of the cropped photograph.

The masking device for cropping photographs viewed on a viewing screen of a photographic printer includes a first flat opaque frame having an aperture in the center thereof. The first frame is adapted for receipt in front of the photographic paper in the printer. A second flat frame is attached to the first frame and includes an aperture in the center thereof. The second flat frame may be transparent with intersecting lines surrounding an area corresponding to the size of the aperature in the first frame or may have an aperture the same size as the aperture in the first frame. The second frame is adapted for receipt in the front of the view screen of the photographic printer. A key slot having tabs is provided in the edge of the first frame and is adapted for actuating the electrical circuitry of the printer for advancing the photographic paper in the printer for width of the aperature in the frames. The key slot is also used for actuating the electrical circuitry of the printer for adjusting the exposure setting of the printer to correspond with the size of the photograph cropped by the masking device.

The advantages and objects of the invention will become evident from the following detailed description when read in conjunction with the accompanying drawings which illustrate the preferred embodiments of the invention.

BRIEF DESCRIPTION OF THE DRAWINGS

In FIGS. 1a, 1b, and 1c, three masking devices are shown having different size apertures for masking photo graphic print paper.

FIG. 2 is a front view of a standard photographic printer with the masking device mounted on the printer head.

FIG. 3 is a perspective view of one of the masking devices partially inserted into the top of the printer head and in front of the print paper.

FIG. 4 is an enlarged front view of the masking device mounted in place on the printer head.

FIG. 5 is a partial top view of the printer head with the key slot of the masking device actuating one of the electrical switches of the printer.

FIG. 6 illustrates a plurality of key slots in the masking device for controlling the print paper advance and exposure setting.

FIG. 7 is a cross section of the printer head and the masking device inserted therein.

DETAILED DESCRIPTION OF THE DRAWINGS

In FIGS. 1a, 1b, and 1c, a plurality of masking devices are illustrated and designed by general reference number 10. The masking devices 10 are similar except for the sizes of the aperture therein, which are used for cropping photographs viewed in a view screen of a photographic printer.

In FIG. 1A the masking device 10 includes a first flat opaque frame 12 and a second flat frame 14 attached together by a hinge 15. The second flat frame 14 may be made of a transparent material or may be opaque. The second flat frame 14 is preferably made of transparent material so that the photograph viewed on the view screen can be seen therethrough and the portion to be cropped from the photograph may be seen.

The device 10 further includes an aperture 16 in the first frame 12 and an aperture 18 in the second frame 14. The aperture 16 and the aperture 18 are similar in size and have a width dimension indicated by "a" and a height dimension indicated by "b". The dimensions "a" and "b" represent for example, a standard photographic size of 4 inches by 5 inches.

The device 10 also includes a key slot 20 in one edge of the first frame 12 and having an outwardly extending tab 22. This structure is shown more clearly in FIGS. 5 and 6 and is used for controlling the electronic circuitry of the printer used in advancing the print paper of the printer and exposure setting of the printer.

In FIG. 1B an aperature 24 in the first frame 12 has a width dimension of "c" and a height dimension of "d". These dimensions represent a standard photographic size of 3½"×3½". In the second frame 14, rather than having an aperture similar to the aperture 18 shown in FIG. 1A, a plurality of intersecting lines 26 are used to surround an area having the same dimensions "c" and "d". This area is represented by reference numeral 28 and it is the same size as the aperature 24. It can be appreciated that in using the lines 26, the second frame 14 would be transparent so that the photograph can be seen surrounded by the lines 26 and the peripheral area outside the lines 26 which would be the portion of the photograph cropped from the photograph. It should be noted that in the upper edge of the first frame 12 there is a key slot 30 having a different size than the key slot 20 shown in FIG. 1A. The differences in the key slots are required since the paper advance and the exposure setting are different for the photograph sized 3½"×3½" and 4"×5".

In FIG. 1C, the masking device 10 is shown having an aperature 32 in the first frame 12 and an aperture 34 in the second frame 14. The apertures 32 and 34 have a width dimension of "e" and a height dimension of "f". The dimensions "e" and "f" correspond with the standard photographic sizes of 8 inches by 10 inches. The masking device 10 shown in FIG. 1C would generally be used for providing a border on an 8 inch by 10 inch photograph. It should again be noted that a key slot 36 is shown having a different size than the key slots 20 and 30. It can be appreciated that the paper feed and exposure setting would be different for an 8 inch by 10 inch photographic print.

The second flat frame 14 shown in FIGS. 1A, 1B and 1C is preferably transparent, although the frames 14 shown in FIGS. 1A and 1C having aperatures 18 and 34 could be opaque. The hinges 15 attaching the first frame 12 in the second frame 14 allow the masking device 10 to be folded with one frame on top of the other for convenience in storage, when the device 10 is not in use.

In FIG. 2 a standard photographic printer 40 is shown having a print head 42. The print head 42 is disposed above a negative holder 44 with a negative mounted thereon. While the use of a negative is discussed the holder 44 could also be used for positives, slides, etc., used for producing photographic prints therefrom. The negative is viewed on a view screen 46 in the front of the printer head 42. In this illustration an example is used of a fisherman with a fish and the sun and mountains in the background. The masking device 10 shown in FIG. 1A is inserted into the print head 46 with the second transparent frame 14 disposed in front of the view screen 46. An aperture 18 in the second frame 14 outlines the fisherman and the fish. The surrounding mountains, the sun and a tree are shown on the view screen and this is the portion of the negative which will be cropped when the photographic printer prints a picture therefrom.

In FIG. 3, a perspective view of the print head 42 is illustrated with print paper 48 shown in dotted lines mounted on a supply roll 50 in a supply magazine 52 and unrolled and transported across the top of the print head 42 and received in a takeup magazine 54 and rolled on a takeup roll 56.

In this view a portion of the first opaque mask 12 can be seen inserted into the top of the print head 42 and received in front of the photographic paper 48. When the first frame 12 is completely received in the print head 42 the photographic paper 48 is masked so that only the portion of the photographic paper 42 behind the aperture 16 is exposed when printing from the negative. Therefore, what is seen inside the aperture 18 in front of the view screen 46 is exactly what will be developed on the print paper 48. The area surrounding the aperture 18 is cropped. This area can be seen on the view screen 46 when the second frame 14 is made of a transparent material. In the back of the print head 42 is a plurality of electrical switches 60 which are connected to the electrical circuitry of the printer 40 for controlling the paper advance of the print paper 48 and the exposure setting of the printer. One of the switches 60 are actuated by the outwardly extending tab 22 in the key slot 20. Referring to FIG. 4, an enlarged view of the photograph with the fisherman on the view screen 46 is shown. In this view it can be seen that only the fisherman and the fish will be printed and the surrounding mountains, tree and sun would be cropped from the negative. Through the use of a transparent second frame 14 the negative mounted on the carrier 44 can be moved or adjusted so that the operator of the printer 40 can adjust what portion of the negative is to be printed and what portion of the negative is to be cropped.

In FIG. 5 a rear edge portion of the first frame 12 can be seen extending outwardly through a light tight seal 62 in the rear of the print head 42. In this view the tab 22 can be seen actuating one of the switches 60. By activating one of the switches 60 the appropriate paper advance and the exposure setting is made. The five switches 60 shown in FIG. 5 are received in separate but equal areas in the key slot. These areas are outlined in dotted lines and designated by numbers 1 through 5. In this example the switch 60 received in the area 4 would operate the electrical circuit for advancing the paper 48 for a 4 inch by 5 inch photographic print. Also, the appropriate exposure setting would be made for this size print.

In FIG. 6, five different key slots are illustrated for representing various standard photographic print sizes. The top frame 12 illustrates a key slot 36 for an 8×10 photograph. The second frame 12 from the top has a key slot 64 with a tab 66 for actuating the electrical circuitry when a 5×7 photograph is printed. The middle frame 12 shows a key slot 20 with a tab 22 for actuating the electrical circuitry when a 4"×5" photograph is printed. The frame 12 which is second from the bottom has a key slot 68 with the areas 4 and 5 filled with tabs integrally formed in the frame 12. These tabs would activate the two switches 60 on the right hand side for printing 5 inch by 4 inch prints. The frame 12 at the bottom has a key slot 30 with the areas 3, 4 and 5 filled for activating the three switches 60 on the right hand side for printing 3½ inch by 3½ inch photographic prints.

In FIG. 7a cross section of the print head 42 is illustrated with the frame 12 of the masking device 10 inserted therein and in front of the print paper 48. The frame 14 is shown disposed in front of the view screen 46. Both of the frames 12 and 14 are shown in cross section to expose the apertures 16 and 18 therein.

In this view the print head 42 can be seen with a mirror mount 70 having a mirror 72 for reflecting the image of the negative shown as lines 74. The mirror 72 is held at a 45° angle from the view screen 46 for reflecting the image thereon. It should be noted that the shaded area outlined by the lines 74 represent the area that will be cropped and this is the area surrounding the aperture 18 in the frame 14 and the area surrounding the aperture 16 in the frame 12.

When the negative has been viewed on the view screen 46 and it has been determined what area is to be cropped from the negative, the mirror mount 70 is lowered into its position adjacent the view screen 46 as shown in dotted lines. At this line a light seal mount 76 which is disposed adjacent the frame 12 and in front of the print paper 48 is lowered into its position shown in dotted lines. The light seal mount 76 protects the paper 48 from light exposure from the negative image. When the mount 76 is lowered into its vertical position the image shown by dotted lines 74 exposes the paper 48 to the same image through the aperture 16 in the frame 12 as seen previously, through the aperture 18 in the frame 14.

When the printing of the desired image has been completed on the paper 48, the light seal mount 76 is again raised to its original position and the mirror mount 70 is raised for using the view screen 46 by the operator.

Changes may be made in the construction and arrangement of the parts or elements of the embodiments as disclosed herein without departing from the spirit or scope of the invention defined in the following claims.

I claim:

1. A masking device for cropping a photograph seen through a viewing screen in a photographic printer, the masking device comprising;
    a first flat opaque frame having an aperture in the center thereof, said first frame adapted for receipt in front of the photographic paper disposed in the printer; and
    a second flat frame attached to said first frame and having an aperature at the center thereof, the size of the aperture in said first frame corresponding to the aperture in said second frame, said second frame adapted for receipt in the front of the viewing screen of the photographic printer.

2. The masking device as described in claim 1 wherein said second flat frame is transparent.

3. The masking device as described in claim 1 wherein said second flat frame is opaque.

4. The masking device as described in claim 1 wherein said second frame is attached to said first frame by a hinge, said hinge allowing said first frame to be folded on top of said second frame for storing the masking device prior to use on the photographic printer.

5. The masking device as described in claim 1 wherein said first frame has a key slot in the edge therein, said key slot adapted to be indexed adjacent electric switches mounted on the printer, said key slot having outwardly extending tabs for actuating the switches for advancing the photographic paper in the printer the width of the aperature in said frames and adjusting the exposure setting of the printer to correspond with the size of the photograph cropped by the masking device.

6. A masking device for cropping photographs viewed on a viewing screen of a photographic printer, the masking device comprising;
    a first flat opaque frame having an aperature in the center thereof, said first frame adapted for receipt in the front of photographic paper disposed in the printer;
    a second flat transparent frame hingeably attached to said first flat frame said second frame having an aperture in the center thereof, said aperture corresponding in size to the aperature inside first frame, said second frame adapted for receipt in front of the viewing screen of the photographic printer; and
    a key slot in the edge of said first frame, said key slot adapted for actuating electrical circuitry in the printer for advancing the photographic paper in the printer the width of the aperature in said frames and adjusting the exposure setting of the printer to correspond with the size of the photograph cropped by the masking device.

7. A masking device for cropping photographs on a viewing screen of a photographic printer, the masking device comprising:
    a first flat opaque frame having an aperture in the center thereof, said first frame adapted for receipt in front of the photographic paper disposed in the printer;
    a second transparent flat frame having intersecting lines in the center thereof, said intersecting lines surrounding an area corresponding to the size of the aperture in said first frame, said second frame adapted for receipt in the front of the viewing screen of the photographic printer; and
    a hinge attached to said first frame and said second frame, said hinge allowing said first frame to be folded on top of said second frame for storing the masking device prior to use on the photographic printer.

* * * * *